United States Patent
Tsuji et al.

(10) Patent No.: US 6,914,110 B2
(45) Date of Patent: *Jul. 5, 2005

(54) PROCESS FOR PRODUCING POLYMER HAVING CROSSLINKABLE SILYL GROUP AND CURABLE COMPOSITION

(75) Inventors: Ryotaro Tsuji, Settsu (JP); Tomoki Hiiro, Settsu (JP)

(73) Assignee: Kaneka Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/478,317

(22) PCT Filed: May 14, 2002

(86) PCT No.: PCT/JP02/04669

§ 371 (c)(1),
(2), (4) Date: Nov. 20, 2003

(87) PCT Pub. No.: WO02/098929

PCT Pub. Date: Dec. 12, 2002

(65) Prior Publication Data

US 2004/0220364 A1 Nov. 4, 2004

(30) Foreign Application Priority Data

May 31, 2001 (JP) .................................. 2001-165026

(51) Int. Cl.[7] .................................................. C08F 4/00
(52) U.S. Cl. .................... 526/222; 526/317.1; 526/319; 526/266; 526/330; 526/303.1; 526/344; 526/346; 526/341
(58) Field of Search ............................ 526/222, 317.1, 526/319, 266, 330, 303.1, 344, 346, 341

(56) References Cited

FOREIGN PATENT DOCUMENTS

| JP | 62-149708 | | 7/1987 |
| WO | WO 98/01478 | | 1/1998 |
| WO | WO 9801478 | * | 1/1998 |

* cited by examiner

*Primary Examiner*—William K. Cheung
(74) *Attorney, Agent, or Firm*—Kenyon & Kenyon

(57) ABSTRACT

A process for producing a crosslinkable silyl group-containing polymer which is excellent in oil resistance, heat resistance, weatherability, low staining properties, and compression set characteristics, includes the steps of radically polymerizing a vinyl monomer in the presence of a thiocarbonylthio group-containing compound with a specific structure, and introducing crosslinkable silyl groups. Also provided is a curable composition which contains the polymer and which is easy to handle.

14 Claims, No Drawings

PROCESS FOR PRODUCING POLYMER HAVING CROSSLINKABLE SILYL GROUP AND CURABLE COMPOSITION

RELATED APPLICATIONS

This is a 371 application of PCT/JP02/04669 filed on 14 May 2002, claiming priority to Japanese Application No. 2001-165026 filed on 31 May 2001, the entire contents of which are incorporated herein by reference.

TECHNICAL FIELD

The present invention relates to a process for producing a crosslinkable silyl group-containing polymer and a curable composition. More particularly, the invention relates to a process for producing a crosslinkable silyl group-terminated vinyl polymer and a curable composition containing the polymer.

BACKGROUND ART

Crosslinkable silyl group-terminated polymers are used as curable compositions for sealants, adhesives, pressure-sensitive adhesives, paint, and potting materials. As the crosslinkable silyl group-terminated polymers, polysiloxane, polyoxypropylene, and polyisobutylene polymers have been known. However, the curable compositions using such polymers have many problems. For example, although polysiloxane polymers exhibit excellent weatherability, heat resistance, and cold temperature resistance, they exhibit unsatisfactory oil resistance, low staining properties, paintability, and gas-barrier properties. Although polyoxypropylene polymers exhibit low staining properties and satisfactory paintability, they have insufficient weatherability. With respect to polyisobutylene polymers, although excellent weatherability, low water vapor transmission, and gas-barrier properties are exhibited, they are difficult to handle due to their high viscosity, and it takes a long time to perform moisture-curing (curing by water).

As moisture-curing compositions which are excellent in heat resistance, weatherability, oil resistance, and low staining properties, and which are easy to handle, curable compositions containing crosslinkable silyl group-terminated acrylic polymers as principal components have been suggested.

Examples of methods for producing acrylic polymers contained in the compositions include methods disclosed in Japanese Examined Patent Application Publication Nos. 3-14068 and 5-72427 in which acrylic monomers are radically polymerized using a crosslinkable silyl group-containing mercaptan chain transfer agent, a crosslinkable silyl group-containing disulfide chain transfer agent, or a crosslinkable silyl group-containing azo polymerization initiator. However, in these production methods, it is difficult to introduce crosslinkable silyl groups into the ends of the polymers reliably, and it is not possible to produce compositions having satisfactory physical properties. Since crosslinkable silyl groups are hydrolyzed, it is not possible to perform water-based polymerization, such as emulsion polymerization or suspension polymerization. Even when solution polymerization is performed, since the water content must be controlled strictly, the production process becomes complicated.

Japanese Examined Patent Application Publication No. 4-55444 discloses a method in which a crosslinkable silyl group-containing hydrosilane or crosslinkable silyl group-containing tetrahalosilane is used as a chain transfer agent. However, in this method, it is also difficult to introduce crosslinkable silyl groups into the ends of the polymer at high yield, and it is not possible to produce cured compositions having satisfactory physical properties. Furthermore, as in the above-mentioned example, since crosslinkable silyl groups are hydrolyzed, it is not possible to perform water-based polymerization, such as emulsion polymerization or suspension polymerization. Even when solution polymerization is performed, since the water content must be controlled strictly, the production process becomes complicated.

Japanese Unexamined Patent Application Publication No. 6-211922 discloses a method in which a hydroxyl-terminated acrylic polymer is produced using a hydroxyl-containing polysulfide chain transfer agent in large excess relative to an initiator, and then the hydroxyl groups are converted into crosslinkable silyl groups. However, in this method, a large amount of chain transfer agent must be used, thus being uneconomical.

In order to overcome these problems, a process is disclosed in Japanese Unexamined Patent Application Publication No. 11-80571 in which a crosslinkable silyl group-terminated vinyl polymer is produced by an atom transfer radical polymerization (ATRP) method using a metal complex as a catalyst. However, in the atom transfer radical polymerization method, since the metal complex is used as the catalyst, purification must be performed after polymerization and the process becomes complicated, resulting in a decrease in productivity. In this method, it is also impossible to employ a water-based polymerization technique, such as emulsion polymerization or suspension polymerization.

On the other hand, reversible addition-fragmentation chain transfer (RAFT) polymerization methods are excellent in producing vinyl copolymers because the molecular weight and the molecular weight distribution are controlled and a wide variety of monomers and a wide variety of polymerization techniques including water-based polymerization can be used. The details thereof including the reaction mechanism are described in PCT Publication No. WO98/01478; PCT Publication No. WO99/05099; PCT Publication No. WO99/31144; Macromolecules, 1998, 31, page 5559; Macromolecules, 1999, 32, page 2071; Macromolecules, 1999, 32, page 6977; Macromolecules, 2000, 33, page 243; etc. However, these documents do not describe a method for introducing crosslinkable silyl groups or do not mention a curable composition. The present invention relates to a process for introducing crosslinkable silyl groups into molecular ends by a RAFT polymerization technique, and a curable composition containing, as an essential component, a crosslinkable silyl group-containing polymer produced by the RAFT polymerization technique.

DISCLOSURE OF INVENTION

The present invention has been achieved in order to solve the problems associated with the conventional methods described above. It is an object of the present invention to provide a process for producing a crosslinkable silyl group-containing polymer which is excellent in oil resistance, heat resistance, weatherability, low staining properties, and compression set characteristics, in which a water-based polymerization technique can also be employed and which requires hardly any purification. It is another object of the present invention to provide an easy-to-handle curable composition containing a crosslinkable silyl group-containing polymer produced by the above process.

The present inventors have conducted intensive research to overcome the problems described above and have achieved the present invention. The present invention includes a process for producing crosslinkable silyl group-containing polymers and curable compositions containing the polymers, which will be described below.

In the process of the present invention, first, a radically polymerizable vinyl monomer is radically polymerized by a RAFT polymerization technique using a thiocarbonylthio group-containing compound with a specific structure as a chain transfer agent to prepare a thiocarbonylthio group-containing polymer. Next, the thiocarbonylthio group of the resultant polymer is converted into a mercapto group, and the polymer and a compound having a crosslinkable silyl group and an isocyanato group in each molecule are coupled via the mercapto group. A crosslinkable silyl group-containing polymer is thereby produced.

The thiocarbonylthio group-containing compound used in the present invention is at least one compound selected from the group consisting of a compound represented by general formula (1):

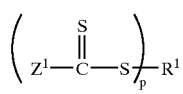
(1)

(wherein $R^1$ is a p-valent organic group of 1 or more carbon atoms which may contain one of nitrogen, oxygen, sulfur, halogen, silicon, phosphorus, and metal atoms, or which may be a polymer; $Z^1$ is a hydrogen atom, halogen atom, or monovalent organic group of 1 or more carbon atoms which may contain one of nitrogen, oxygen, sulfur, halogen, silicon, and phosphorus atoms, or which may be a polymer; when plural $Z^1$s are present, the plural $Z^1$s may be the same or different; and p is an integer of 1 or more), and a compound represented by general formula (2):

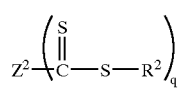
(2)

(wherein $R^2$ is a monovalent organic group of 1 or more carbon atoms which may contain one of nitrogen, oxygen, sulfur, halogen, silicon, phosphorus, and metal atoms, or which may be a polymer; $Z^2$ is an oxygen atom (when q=2), sulfur atom (when q=2), nitrogen atom (when q=3), or q-valent organic group of 1 or more carbon atoms which may contain one of nitrogen, oxygen, sulfur, halogen, silicon, and phosphorus atoms, or which may be a polymer; plural $R^2$s may be the same or different; and q is an integer of 2 or more).

In the structure of the thiocarbonylthio group-containing compound represented by general formula (1), $R^1$ is not particularly limited. In view of availability of the compound, preferably, $R^1$ has 1 to 20 carbon atoms, and p is 6 or less. Examples of $R^1$ include alkyl, substituted alkyl, aralkyl, substituted aralkyl, a polyvalent aliphatic hydrocarbon group, a polyvalent aromatic hydrocarbon group, a polyvalent aliphatic hydrocarbon group with an aromatic ring, a polyvalent aromatic hydrocarbon group with an aliphatic group, a polyvalent aliphatic hydrocarbon group containing a heteroatom, and a polyvalent aromatic substituted hydrocarbon group containing a heteroatom. In view of polymerization activity and availability of the compound, $R^1$ is preferably benzyl, 1-phenylethyl, 2-(2-phenyl)propyl, 1-acetoxyethyl, 1-(4-methoxyphenyl)ethyl, ethoxycarbonylmethyl, 2-(2-ethoxycarbonyl)propyl, 2-(2-cyano)propyl, tert-butyl, 1,1,3,3-tetramethylbutyl, 2-[2-(p-chlorophenyl)]propyl, vinylbenzyl, tert-butylthio, 2-carboxylethyl, carboxylmethyl, cyanomethyl, 1-cyanoethyl, 2-(2-cyano)butyl, or any one of organic groups represented by general formulae below, (wherein r is an integer of 0 or more, and s is an integer of 1 or more).

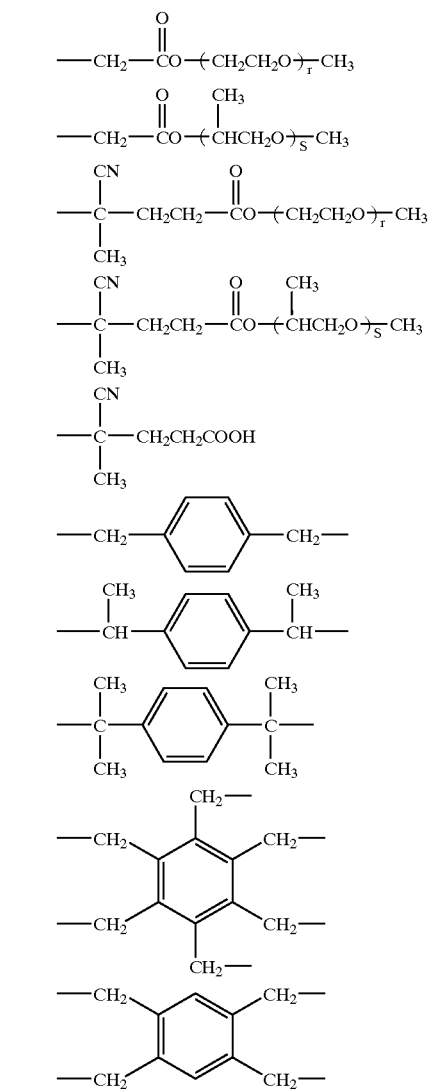

In the above formulae, each of r and s is preferably 500 or less in view of availability of the compound.

Furthermore, as described above, $R^1$ may be a polymer. Examples thereof include a hydrocarbon group having a poly(ethylene oxide) structure, a hydrocarbon group having a poly(propylene oxide) structure, a hydrocarbon group having a poly(tetramethylene oxide) structure, a hydrocarbon group having a poly(ethylene terephthalate) structure, a hydrocarbon group having a poly(butylene terephthalate) structure, a hydrocarbon group having a polydimethylsiloxane structure, a hydrocarbon group having a polycarbonate structure, a hydrocarbon group having a polyethylene structure, a hydrocarbon group having a polypropylene structure, and a hydrocarbon group having a polyacrylonitrile structure. These hydrocarbon groups may contain at least one of oxygen, nitrogen, and sulfur atoms, and may contain a cyano group, an alkoxy group, or the like. The molecular weight thereof is usually 500 or more. Hereinafter, in the present invention, when a group is a polymer, examples of the polymer correspond to those described above.

$Z^1$ in general formula (1) is not particularly limited. When $Z^1$ is an organic group, preferably, the organic group has 1 to 20 carbon atoms in view of availability of the compound. Examples of $Z^1$ include alkyl, substituted alkyl, alkoxy, aryloxy, aryl, substituted aryl, aralkyl, substituted aralkyl, N-aryl-N-alkylamino, N,N-diarylamino, N,N-dialkylamino, thioalkyl, and dialkylphosphinyl. In view of polymerization activity and availability of the compound, $Z^1$ is preferably phenyl, methyl, ethyl, benzyl, 4-chlorophenyl, 1-naphthyl, 2-naphthyl, diethoxyphosphinyl, n-butyl, tert-butyl, methoxy, ethoxy, methylthio, phenoxy, phenylthio, N,N-dimethylamino, N,N-diethylamino, N-phenyl-N-methylamino, N-phenyl-N-ethylamino, benzylthio, pentafluorophenoxy, or any one of organic groups represented by formulae below.

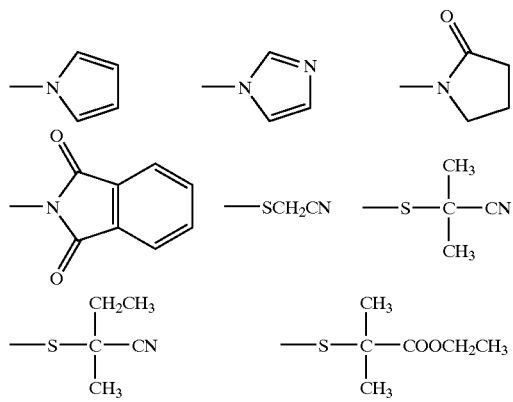

In the structure of the thiocarbonylthio group-containing compound represented by general formula (2), $R^2$ is not particularly limited. In view of availability of the compound, preferably, $R^2$ has 1 to 20 carbon atoms. Examples of $R^2$ include alkyl, substituted alkyl, aralkyl, and substituted aralkyl. In view of polymerization activity and availability of the compound, $R^2$ is preferably benzyl, 1-phenylethyl, 2-(2-phenyl)propyl, 1-acetoxyethyl, 1-(4-methoxyphenyl)ethyl, ethoxycarbonylmethyl, 2-(2-ethoxycarbonyl)propyl, 2-(2-cyano)propyl, tert-butyl, 1,1,3,3-tetramethylbutyl, 2-[2-(p-chlorophenyl)]propyl, vinylbenzyl, tert-butylthio, 2-carboxylethyl, carboxylmethyl, cyanomethyl, 1-cyanoethyl, 2-(2-cyano)butyl, or any one of organic groups represented by general formulae below, (wherein r is an integer of 0 or more, and s is an integer of 1 or more).

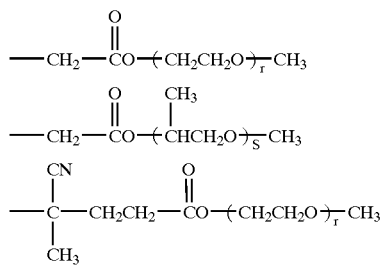

In the above formulae, each of r and s is preferably 500 or less in view of availability of the compound.

Although $Z^2$ in general formula (2) is not particularly limited, q is preferably 6 or less. In view of availability of the compound, when $Z^2$ is an organic group, preferably, the organic group has 1 to 20 carbon atoms. Examples of $Z^2$ include a polyvalent aliphatic hydrocarbon group, a polyvalent aromatic hydrocarbon group, a polyvalent aliphatic hydrocarbon group with an aromatic ring, a polyvalent aromatic hydrocarbon group with an aliphatic group, a polyvalent aliphatic hydrocarbon group containing a heteroatom, and a polyvalent aromatic substituted hydrocarbon group containing a heteroatom. In view of polymerization activity and availability of the compound, $Z^2$ is preferably any one of the organic groups represented by formulae below, (wherein r is an integer of 0 or more, and s is an integer of 1 or more).

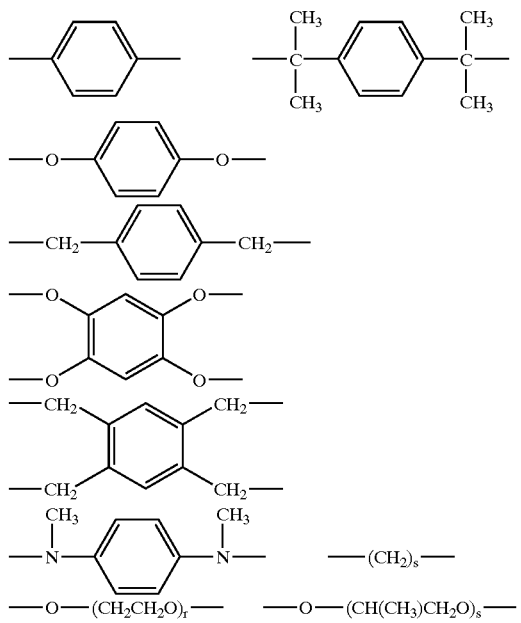

In the above formulae, each of r and s is preferably 500 or less in view of availability of the compound.

Specific examples of thiocarbonylthio group-containing compounds used in the present invention include, but are not limited to, compounds represented by formulae below, wherein Me, Et, Ph, and Ac represent methyl, ethyl, phenyl, and acetyl, respectively; r is an integer of 0 or more; and s is an integer of 1 or more).

In the above formulae, each of r and s is preferably 500 or less in view of availability of the compound.

Among the thiocarbonylthio group-containing compounds described above, thiocarbonylthio group-containing compounds in which p is 2 or more are preferable because it is possible to produce multifunctional crosslinkable silyl group-containing polymers. Furthermore, as the thiocarbonylthio group-containing compound used in the present invention, a compound represented by general formula (3):

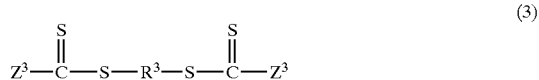

(wherein $R^3$ is a divalent organic group which may contain one of nitrogen, oxygen, sulfur, halogen, silicon, phosphorus, and metal atoms, or which may be a polymer; each $Z^3$ is a hydrogen atom, halogen atom, or monovalent organic group of 1 or more carbon atoms which may contain one of nitrogen, oxygen, sulfur, halogen, silicon, and phosphorus atoms, or which may be a polymer; and $Z^3$s may be the same or different), is more preferable because it is possible to produce a telechelic (i.e., functional at both ends) crosslinkable silyl group-containing polymer, which exhibits satisfactory physical properties when used as a curable composition.

In the structure of the compound represented by general formula (3) which has thiocarbonylthio groups at both ends, $R^3$ is not particularly limited. In view of availability of the compound, preferably, $R^3$ has 1 to 20 carbon atoms. In view of polymerization activity and availability, $R^3$ is preferably any one of organic groups represented by formulae below.

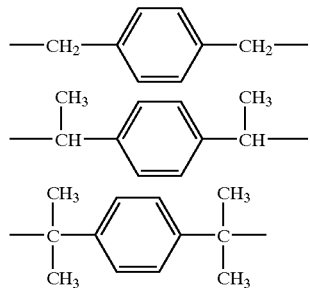

$Z^3$ in general formula (3) is not particularly limited, and is the same as $Z^1$ in general formula (1).

Specific examples of the thiocarbonylthio group-containing compound represented by general formula (3), which is preferably used in the present invention, and which is capable of producing a telechelic (i.e., functional at both ends) crosslinkable silyl group-containing polymer, include, but are not limited to, compounds represented by formulae below, (wherein Me represents methyl and Ph represents phenyl).

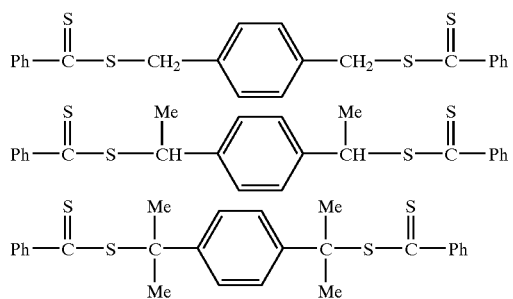

The thiocarbonylthio group-containing compounds used in the present invention may be used alone or in combination.

The vinyl monomer used in the present invention is not particularly limited as long as it is radically polymerizable. Examples of vinyl monomers which may be used include methacrylate esters, such as methyl methacrylate, ethyl methacrylate, n-butyl methacrylate, isobutyl methacrylate, tert-butyl methacrylate, 2-ethylhexyl methacrylate, tridecyl methacrylate, stearyl methacrylate, cyclohexyl methacrylate, benzyl methacrylate, 2-hydroxyethyl methacrylate, 2-hydroxypropyl methacrylate, dimethylaminoethyl methacrylate, diethylaminoethyl methacrylate, glycidyl methacrylate, tetrahydrofurfuryl methacrylate, ethylene glycol dimethacrylate, triethylene glycol dimethacrylate, tetraethylene glycol dimethacrylate, 1,3-butylene glycol dimethacrylate, trimethylolpropane trimethacrylate, isopropyl methacrylate, pentyl methacrylate, hexyl methacrylate, heptyl methacrylate, octyl methacrylate, nonyl methacrylate, decyl methacrylate, dodecyl methacrylate, phenyl methacrylate, tolyl methacrylate, isobornyl methacrylate, 2-methoxyethyl methacrylate, 3-methoxybutyl methacrylate, 2-aminoethyl methacrylate, 2-methacryloyloxypropyltrimethoxysilane, 2-methacryloyloxypropyldimethoxymethylsilane, trifluoromethyl methacrylate, pentafluoroethyl methacrylate, and 2,2,2-trifluoroethyl methacrylate; acrylate esters, such as methyl acrylate, ethyl acrylate, n-propyl acrylate, isopropyl acrylate, n-butyl acrylate, hexyl acrylate, 2-ethylhexyl acrylate, cyclohexyl acrylate, octyl acrylate, decyl acrylate, dodecyl acrylate, phenyl acrylate, tolyl acrylate, benzyl acrylate, isobornyl acrylate, 2-methoxyethyl acrylate, 3-methoxybutyl acrylate, 2-hydroxyethyl acrylate, 2-hydroxypropyl acrylate, stearyl acrylate, glycidyl acrylate, 2-acryloyloxypropyldimethoxymethylsilane, 2-acryloyloxypropyltrimethoxysilane, trifluoromethyl acrylate, pentafluoroethyl acrylate, 2,2,2-trifluoroethyl acrylate, 3-dimethylaminoethyl acrylate, isobutyl acrylate, 4-hydroxybutyl acrylate, tert-butyl acrylate, acrylate of alkyl-modified dipentaerythritol, ethylene oxide-modified bisphenol A diacrylate, Carbitol acrylate, acrylate of ε-caprolactone-modified dipentaerythritol, caprolactone-modified tetrahydrofurfuryl acrylate, diacrylate of caprolactone-modified neopentyl glycol hydroxypivalate, ditrimethylolpropane tetraacrylate, dipentaerythritol hexaacrylate, dipentaerythritol pentaacrylate, tetraethylene glycol acrylate, tetrahydrofurfuryl acrylate, tripropylene glycol acrylate, trimethylolpropane ethoxy triacrylate, trimethylolpropane triacrylate, neopentyl glycol diacrylate, diacrylate of neopentyl glycol hydroxypivalate, 1,9-nonandiol acrylate, 1,4-butanediol acrylate, 2-propanoic acid [2-[1,1-dimethyl-2-[(1-oxo-2-propenyl)oxy]ethyl]-5-ethyl-1,3-dioxane-5-yl]methyl ester, 1,6-hexanediol acrylate, pentaerythritol triacrylate, 2-acryloyloxypropylhydrogen phthalate, methyl 3-methoxyacrylate, and allyl acrylate; aromatic alkenyl compounds, such as styrene, α-methylstyrene, p-methylstyrene, p-methoxystyrene, divinylbenzene, and vinylnaphthalene; vinyl cyanide compounds, such as acrylonitrile and methacrylonitrile; conjugated diene compounds, such as butadiene and isoprene; halogen-containing unsaturated compounds, such as vinyl chloride, vinylidene chloride, tetrafluoroethylene, hexafluoropropylene, vinylidene fluoride, vinyl bromide, and chloroprene; silicon-containing unsaturated compounds, such as vinyltrimethoxysilane, vinyltriethoxysilane, vinyltrimethylsilane, vinyltriphenylsilane, and vinyltriethylsilane; unsaturated dicarboxylic compounds, such as maleic anhydride, maleic acid, maleate monoesters, maleate diesters, fumaric acid, fumarate monoesters, and fumarate diesters; vinyl ester compounds, such as vinyl acetate, vinyl propionate, vinyl pivalate, vinyl benzoate, vinyl cinnamate, divinyl carbonate, vinylethyl carbonate, and vinylphenyl carbonate; allyl ester compounds, such as allyl acetate, allyl propionate, allyl pivalate, allyl benzoate, allyl cinnamate, diallyl carbonate, allylmethyl carbonate, and allylphenyl carbonate; unsaturated group-containing ether compounds, such as vinyl phenyl ether, vinyl ethyl ether, divinyl ether, trimethylolpropane monovinyl ether, trimethylolpropane divinyl ether, trimethylolpropane trivinyl ether, pentaerythritol monovinyl ether, pentaerythritol divinyl ether, pentaerythritol trivinyl ether, pentaerythritol tetravinyl ether, 1,4-butanediol monovinyl ether, 1,4-butanediol divinyl ether, ethylene glycol monovinyl ether, ethylene glycol divinyl ether, propylene glycol monovinyl ether, propylene glycol divinyl ether, polyethylene glycol monovinyl ether, polyethylene glycol divinyl ether, polypropylene glycol monovinyl ether, polypropylene glycol divinyl ether, vinyl glycidyl ether, allyl phenyl ether, allyl ethyl ether, diallyl ether, vinyl allyl ether, trimethylolpropane monoallyl ether, trimethylolpropane diallyl ether, trimethylolpropane triallyl ether, pentaerythritol monoallyl ether, pentaerythritol diallyl ether, pentaerythritol triallyl ether, pentaerythritol tetraallyl ether, 1,4-butanediol monoallyl ether, 1,4-butanediol diallyl ether, ethylene glycol monoallyl ether, ethylene glycol diallyl ether, propylene glycol monoallyl ether, propylene glycol diallyl ether, polyethylene glycol monoallyl ether, polyethylene glycol diallyl ether, polypropylene glycol monoallyl ether, polypropylene glycol diallyl ether, and allyl glycidyl ether; maleimide compounds, such as maleimide, methylmaleimide, ethylmaleimide, propylmaleimide, butylmaleimide, hexylmaleimide, octylmaleimide, dodecylmaleimide, stearylmaleimide, phenylmaleimide, and cyclohexylmaleimide; acrylic acid and methacrylic acid; acrolein and methacrolein; cyclopolymerizable compounds, such as 1,6-heptadiene and diallylammonium salts; and N-vinyl pyrrolidone, N-vinyl carbazole, etc. These compounds may be used alone or in combination. When a copolymer is produced from a plurality of vinyl monomers, any form may be acceptable, such as a random copolymer, a block copolymer, a graft copolymer, or a combination of these.

Among the vinyl monomers described above, in view of availability and cost, preferred are styrene, α-methylstyrene, vinyl chloride, vinylidene chloride, methacrylate esters, acrylate esters, methacrylic acid, acrylic acid, methacrylamide, acrylamide, methacrylonitrile, acrylonitrile, vinyl acetate, maleic anhydride, and maleimide compounds. In view of the fact that the resultant polymer is excellent in oil resistance, heat resistance, weatherability, and low staining properties, more preferred are methacrylate esters and acrylate esters. In view of the fact that a cured composition is flexible when the composition of the present invention is cured, particularly preferred are methacrylate esters and acrylate esters which can produce polymers with a glass transition temperature of 30° C. or less. In view of availability and cost, as the acrylate esters which can produce polymers with a glass transition temperature of 30° C. or less, n-butyl acrylate and tert-butyl acrylate are preferable.

When the vinyl monomer used in the present invention is polymerized, the thiocarbonylthio group-containing compound must be present in the reaction system during polymerization. The addition method for the thiocarbonylthio group-containing compound is not particularly limited. In order to control the molecular weight and the molecular weight distribution of the polymer and in order to increase the introduction rate of crosslinkable silyl groups, preferably, the thiocarbonylthio group-containing compound is dissolved or dispersed in the reaction system before polymerization is initiated. For example, in the case of solution polymerization, the thiocarbonylthio group-containing compound is preferably dissolved in a solvent or a vinyl monomer before addition. In the case of water-based polymerization, such as emulsion polymerization or suspension polymerization, preferably, the thiocarbonylthio group-containing compound is dissolved in a small amount of solvent before addition, the thiocarbonylthio group-containing compound is dissolved in a vinyl monomer before addition, or the thiocarbonylthio group-containing compound is preliminarily stirred with a homogenizer or the like before dispersion.

The amount of the thiocarbonylthio group-containing compound used is not particularly limited. Since the degree of polymerization of the resultant polymer depends on the number of moles of the thiocarbonylthio group-containing compound added, the amount of the thiocarbonylthio group-containing compound may be calculated based on the required degree of polymerization or number-average molecular weight of the polymer. In general, the relationship between the number of moles of the thiocarbonylthio group-containing compound and the degree of polymerization of the resultant polymer is represented by the following equation.

Degree of polymerization=(Number of moles of vinyl monomer)/(Number of moles of thiocarbonylthio group-containing compound)

Additionally, the number-average molecular weight is calculated by multiplying the degree of polymerization by the molecular weight of the vinyl monomer.

In the present invention, when a vinyl monomer is radically polymerized in the presence of a thiocarbonylthio group-containing compound, any method commonly used in the art, such as bulk polymerization, solution polymerization, emulsion polymerization, suspension polymerization, or microsuspension polymerization, may be employed. Among them, in view of cost and safety, water-based polymerization, such as emulsion polymerization, suspension polymerization, or microsuspension polymerization, is preferred.

In the case of solution polymerization of the vinyl monomers, examples of solvents which may be used include, but are not limited to, hydrocarbon solvents, such as heptane, hexane, octane, and mineral spirit; ester solvents, such as ethyl acetate, n-butyl acetate, isobutyl acetate, ethylene glycol monomethyl ether acetate, and diethylene glycol monobutyl ether acetate; ketone solvents, such as acetone, methyl ethyl ketone, methyl isobutyl ketone, diisobutyl ketone, and cyclohexanone; alcohol solvents, such as methanol, ethanol, isopropanol, n-butanol, sec-butanol, and isobutanol; ether solvents, such as tetrahydrofuran, diethyl ether, dibutyl ether, dioxane, ethylene glycol dimethyl ether, and ethylene glycol diethyl ether; and aromatic petroleum solvents, such as toluene, xylene, benzene, Swasol 310 (manufactured by Cosmo Oil Co., Ltd.), Swasol 1000 (manufactured by Cosmo Oil Co., Ltd.), and Swasol 1500 (manufactured by Cosmo Oil Co., Ltd.). These solvents may be used alone or in combination. The types and amounts of solvent used may be determined in consideration of the solubility of the monomers, the solubility of the resultant polymer, the polymerization initiator concentration and the monomer concentration suitable for achieving a satisfactory reaction rate, the solubility of the thiocarbonylthio group-containing compound, effects on human body and environment, availability, cost, etc., and are not particularly limited. Above all, industrially, toluene is preferred in view of availability and cost.

In the present invention, in the case of emulsion polymerization or microsuspension polymerization of the vinyl monomers, examples of emulsifiers which may be used include, but are not limited to, anionic surfactants, such as fatty acid soap, rosin acid soap, sodium naphthalenesulfonate-formalin condensates, sodium alkylbenzene sulfonate, sodium alkysulfate (e.g., sodium dodecylsulfate), ammonium alkylsulfate, triethanolamine alkylsulfate, sodium dialkylsulfosuccinate, sodium alkyldiphenylether disulfonate, sodium polyoxyethylene alkyl ether sulfate, and sodium polyoxyethylene alkylphenyl ether sulfate; nonionic surfactants, such as polyoxyathylene alkyl ether, polyoxyethylene higher alcohol ether, sorbitan fatty acid ester, polyoxyethylene sorbitan fatty acid ester, polyoxyethylene sorbitol fatty acid ester, glycerin fatty acid ester, polyoxyethylene fatty acid ester, polyoxyethylene aklylamine, and alkyl alkanolamide; and cationic surfactants, such as alkyltrimethylammonium chloride. These emulsifiers may be used alone or in combination. As necessary, a cationic surfactant, such as an alkylamine hydrochloride, may be used, or a dispersant for suspension polymerization which will be described below may also be added. The amount of the emulsifier used is usually 0.1 to 20 parts by weight based on 100 parts by weight of the monomers used, but is not limited thereto.

In the present invention, in the case of suspension polymerization of the monomers, examples of dispersants which may be used include, but are not limited to, partially saponified poly(vinyl acetate), poly(vinyl alcohol), methyl cellulose, carboxymethyl cellulose, gelatin, poly(alkylene oxide), and combinations of anionic surfactants and dispersing agents. These may be used alone or in combination. The emulsifier used for emulsion polymerization described above may also be used as necessary. The amount of the dispersant used is usually 0.1 to 20 parts by weight based on 100 parts by weight of the monomers, but is not limited thereto.

In the present invention, when vinyl monomers are radically polymerized in the presence of a thiocarbonylthio group-containing compound, the polymerization initiator or polymerization initiation method used is not particularly limited, and any polymerization initiator or polymerization initiation method commonly used in the art may be employed. Examples of polymerization initiators include, but are not limited to, peroxide polymerization initiators, such as methyl ethyl ketone peroxide, methyl isobutyl ketone peroxide, cyclohexanone peroxide, methyl cyclohexanone peroxide, isobutyryl peroxide, 3,5,5-trimethylhexanoyl peroxide, lauroyl peroxide, benzoyl peroxide, tert-butyl hydroperoxide, cumene hydroperoxide, diisopropylbenzene hydroperoxide, p-menthane hydroperoxide, 1,1,3,3-tetramethylbutyl hydroperoxide, di-tert-butyl peroxide, tert-butyl-α-cumyl peroxide, di-α-cumyl peroxide, 1,4-bis[(tert-butylperoxy)isopropyl]benzene, 1,3-bis[(tert-butylperoxy)isopropyl]benzene, 2,5-dimethyl-2,5-bis(tert-butylperoxy)hexane, 2,5-dimethyl-2,5-bis(tert-butylperoxy)-3-hexyne, 1,1-bis(tert-butylperoxy)-3,3,5-trimethylcyclohexane, n-butyl-4,4-bis(tert-butylperoxy)valerate, 2,2-bis(tert-butylperoxy)butane, tert-butylperoxy acetate, tert-butylperoxy isobutylate, tert-butylperoxy octoate, tert-butylperoxy pivalate, tert-butylperoxy neodecanoate, tert-butylperoxy-3,5,5-trimethyl hexanoate, tert-butylperoxy benzoate, tert-butylperoxy laurate, 2,5-dimethyl-2,5-bis(benzoylperoxy)hexane, bis(2-ethylhexyl)peroxy dicarbonate, diisopropylperoxy dicarbonate, di-sec-butylperoxy dicarbonate, di-n-propylperoxy dicarbonate, bis(3-methoxybutyl)peroxy dicarbonate, bis(2-ethoxyethyl)peroxy dicarbonate, bis(4-tert-butylcyclohexyl)peroxy dicarbonate, O-tert-butyl-O-isopropylperoxy carbonate, and succinic acid peroxide; azo polymerization initiators, such as 2,2'-azobis-(2-amidinopropane)dihydrochloride, 2,2'-azobis (dimethylisobutyrate), 2,2'-azobis-(4-methoxy-2,4-dimethylvaleronitrile), 2,2'-azobis(isobutyronitrile), 1,1'-azobis(cyclohexane-1-carbonitrile), azocumene, 2,2'-azobis (2-methylbutyronitrile), 2,2'-azobis-(2,4-dimethylvaleronitrile, 4,4'-azobis(4-cyanovaleric acid), 2-(tert-butylazo)-2-cyanopropane, 2,2'-azobis(2,4,4-trimethylpentane), and 2,2'-azobis(2-methylpropane); inorganic peroxides, such as potassium persulfate and sodium persulfate; vinyl monomers which thermally generate radical species, such as styrene; compounds which generate radical species by light, such as benzoin derivatives, benzophenone, acylphosphine oxide, and photo-redox systems; and redox polymerization initiators including sodium sulfite, sodium thiosulfate, sodium formaldehyde sulfoxylate, ascorbic acid, ferrous sulfate, or the like, as a reducing agent, and potassium peroxydisulfate, hydrogen peroxide, tert-butyl hydroperoxide, or the like, as an oxidizing agent. These polymerization initiators may be used alone or in combination. It may also be possible to use a polymerization initiation system by electron irradiation, X-ray irradiation, radiation irradiation, or the like. With respect to polymerization initiation methods, the methods described in Moad and Solomon "The Chemistry of Free Radical Polymerization", Pergamon, London, 1995, pp. 53–95 may be employed.

In the present invention, the amount of polymerization initiator used is not particularly limited. In order to produce a polymer with a narrow molecular weight distribution, the amount of radical species generated during polymerization is preferably 1 mole or less, and more preferably 0.5 moles or less, relative to 1 mole of thiocarbonylthio group in the thiocarbonylthio group-containing compound. In order to control the amount of radical species generated during polymerization, in addition to the control of the amount of the polymerization initiator, preferably, temperature is controlled in the case of the polymerization initiator which causes thermal dissociation, or the amount of energy is controlled in the case of the polymerization initiation system which generates radicals by light or electron beams. Because of ease of control of polymerization, using a polymerization initiator which causes thermal dissociation, the polymerization reaction is carried out preferably at temperatures which allow the polymerization initiator to have a half-life of 0.5 to 50 hours, more preferably at temperatures which allow the polymerization initiator to have a half-life of 1 to 20 hours, and most preferably at temperatures which allow the polymerization initiator to have a half-life of 5 to 15 hours.

In the present invention, the molecular weight of the polymer produced by radically polymerizing a vinyl monomer is not particularly limited and is set depending on the application. In view of balance between workability and heat resistance, strength, or the like, the number-average molecular weight (Mn) determined by gel permeation chromatography (GPC) is preferably in the range of 1,000 to 1,000,000, and more preferably in the range of 3,000 to 500,000. In the present invention, the molecular weight distribution of the polymer produced by radically polymerizing a vinyl monomer is not particularly limited. Because of excellent workability and strength, the ratio (Mw/Mn) of the weight-average molecular weight (Mw) to the number-average molecular weight (Mn) determined by gel permeation chromatography (GPC) is preferably 2 or less, and more preferably 1.5 or less.

In the production process of the present invention, the thiocarbonylthio groups of the thiocarbonylthio group-containing compound are converted into mercapto groups. The method for converting thiocarbonylthio groups into mercapto groups is not particularly limited. In view of high yield, preferably, a method is employed in which the thiocarbonylthio group-containing compound is allowed to react with a processing agent composed of a compound selected from the group consisting of bases, acids, ammonia, hydrazine, and amine compounds. Among them, when a base, an acid, or a tertiary amine compound is used, in the presence of water, thiocarbonylthio groups are converted into mercapto groups by hydrolysis. When ammonia, hydrazine, a primary amine compound, or a secondary amine compound is used, the presence of water is not required, which is preferable.

Examples of bases which may be used as processing agents include, but are not limited to, alkali metal hydroxides, such as sodium hydroxide, potassium hydroxide, and lithium hydroxide; alkaline-earth metal hydroxides, such as calcium hydroxide, magnesium hydroxide, barium hydroxide, and cesium hydroxide; transition metal hydroxides, such as aluminum hydroxide and zinc hydroxide; alkali metal alcoholates, such as sodium methylate, sodium ethylate, sodium phenylate, lithium ethylate, and lithium butylate; alkaline-earth metal alcoholates, such as magnesium methylate and magnesium ethylate; metal hydrides, such as sodium hydride, lithium hydride, calcium hydride, lithium aluminum hydride, and aluminum borohydride; and organometallic reagents, such as hydrosulfite, n-butyllithium, tert-butyllithium, ethylmagnesium bromide, and phenylmagnesium bromide. Furthermore, alkali metals, such as metallic lithium, metallic sodium, and metallic potassium; and alkaline-earth metals, such as metallic magnesium and metallic calcium may also be used. These bases may be used alone or in combination. Among them, in view of availability, cost, and reactivity, preferred are sodium hydroxide, potassium hydroxide, lithium hydroxide, calcium hydroxide, magnesium hydroxide, sodium methylate, sodium ethylate, sodium hydride, lithium hydride, metallic lithium, metallic sodium, and metallic potassium. Because of ease of handling, more preferred are sodium hydroxide, potassium hydroxide, lithium hydroxide, calcium hydroxide, magnesium hydroxide, sodium methylate, and sodium ethylate.

Examples of acids which may be used as processing agents include, but are not limited to, inorganic acids, such as hydrochloric acid, nitric acid, sulfuric acid, phosphoric acid, hydrofluoric acid, hydrobromic acid, fluoroboric acid, chlorosulfonic acid, hydriodic acid, arsenic acid, and silicofluoric acid; organic acids, such as p-toluenesulfonic acid, trifluoromethyl sulfonic acid, acetic acid, trifluoroacetic acid, methylphosphoric acid, ethylphosphoric acid, n-propylphosphoric acid, isopropylphosphoric acid, n-butylphosphoric acid, laurylphosphoric acid, stearylphosphoric acid, 2-ethylhexylphosphoric acid, isodecylphosphoric acid, dimethyldithiophosphoric acid, diethyldithiophosphoric acid, diisopropyldithiophosphoric acid, and phenylphosphonic acid; and strong acidic ion exchange resins and weak acidic ion exchange resins. Furthermore, compounds which show acidity in reaction with a small amount of water may also be used. Examples of such compounds include acid anhydrides, such as acetic anhydride, propionic anhydride, trifluoroacetic anhydride, phthalic anhydride, and succinic anhydride; acyl halides; and metal halides, such as titanium tetrachloride, aluminum chloride, and silicon chloride. These acids may be used alone or in combination. Among them, in view of availability, cost, and reactivity, preferred are hydrochloric acid, nitric acid, sulfuric acid, phosphoric acid, aluminum chloride, titanium tetrachloride, chlorosulfonic acid, p-toluenesulfonic acid, trifluoromethyl sulfonic acid, acetic acid, and trifluoroacetic acid.

The amine compounds used as processing agents include amines and their analogues. The amine compounds of the present invention also include amides and nitrogen-containing aromatic compounds which are analogous to amines. Examples of such amine compounds include, but are not limited to, hydroxylamine sulfate, hydroxylamine, N-(2-aminoethyl)ethanolamine, N-methylethanolamine, 12-aminododecanoic acid, 3-amino-1-propanol, amine-modified acrylic polymers, allylamine, diallylamine, isopropylamine, diisopropylamine, 3,3'-iminobis (propylamine), ethylamine, diethylamine, triethylamine, 2-ethylhexylamine, 3-(2-ethylhexyloxy)propylamine, 3-ethoxypropylamine, diisobutylamine, 3-(diethylamino) propylamine, di-2-ethylhexylamine, 3-(dibutylamino) propylamine, tert-butylamine, sec-butylamine, n-butylamine, n-propylamine, isopropylamine, 3-(methylamino)propylamine, 3-(dimethylamino) propylamine, N-methyl-3,3'-iminobis(propylamine), 3-methoxypropylamine, isopropanolamine, N-isopropylacrylamide, iminodiacetic acid, 3,3'-iminodipropionitrile, monoethanolamine, diethanolamine, N-ethylethylenediamine, ethyleneimine, ethylenediamine, diethylenetriamine, triethylenetetramine, tetraethylenepentamine, pentaethylenehexamine, N-carboxy-4,4'-methylenebiscyclohexylamine, carbohydrazides, guanidine hydrochloride, guanidine nitrate, guanidine carbonate, guanidine phosphate, guanidine sulfamate, aminoguanidine hydrochloride, aminoguanidine bicarbonate, guanylthiourea, guanylurea phosphate, guanylurea sulfate, glycylglycine, 2-chloroethylamine, 1,4-diaminobutane, 1,2-diaminopropane, 1,3-diaminopropane, diaminomaleonitrile, cyclohexylamine, cyclopentylamine, dicyandiamide, dicyclohexylamine, N-(3-(dimethylamino)propyl) acrylamide, N-(3-(dimethylamino)propyl)methacrylamide, dimethylamineborane, dimethylhydrazine, N,N'-ethylenebis (stearoamide), amide oleate, amide stearate, N,N'-methylenebis(stearoamide), methylol stearoamide, 3,9-bis (3-aminopropyl)-2,4,8,10-tetraoxaspiro[5,5]undecane, CTU guanamine, thiocarbohydrazide, thiosemicarbazide, thiourea, dihydrazide dodecanedioate, trans-1,2-cyclohexanediamine, dihydrazide adipate, dihydrazide sebacate, dihydrazide isophthalate, thiourea dioxide, 2-hydroxyethylaminopropylamine, isobutylamine, 2-bromoethylamine, hexamethylenediamine, 1,6-hexamethylenebis(N,N-dimethylsemicarbazide), n-hexylamine, polyethyleneimine, formamidine, formamidine acetate, formamide, methacrylamide, monomethylamine, dimethylamine, trimethylamine, N,N'-methylenebis(acrylamide), N-methylolacrylamide, monomethylhydrazine, 3-(lauryloxy)propylamine, acetanilide, acetoacet-o-anisidide, acetoacetanilide, acetoacet-m-xylidide, acetoacet-o-chloroanilide, acetoacet-2,5,-dimethoxyanilide, acetoacet-2,5-dimethoxy-4-chloroanilide, acetoacet-o-toluidide, acetoacet-p-toluidide, o-anisidine, p-anisidine, aniline, p-aminoacetanilide, p-aminobenzoic acid, ethyl p-aminobenzoate ester, 2-amino-4-chlorophenol, 2-aminothiazole, 2-aminothiophenol, 2-amino-5-nitrobenzonitrile, o-aminophenol, m-aminophenol, p-aminophenol, p-aminobenzaldehyde, 4-aminobenzonitrile, anthranilic acid, 3-isopropoxyaniline, N-ethylaniline, N-ethylene toluene sulfonamide, 2,4-xylidine, 3,4-xylidine, m-xylylenediamine, p-cresidine, dianisidine, 4,4¹-diaminostilbene-2,2'-disulfonic acid, 1,4-diaminoanthraquinone, 4,4'-diamino-3,3'-diethyldiphenylmethane, 4,4'-diaminobenzanilide, N,N-diethylaniline, diaminodiphenyl ether, diaminonaphthalene, diaminoanthracene, diphenylamine, dibenzylamine, N,N-dimethylaniline, 3,3'-dimethyl-4,4'-diaminodiphenylmethane, sulfanilic acid, 1,1,1',1'-tetramethyl-4,4'-(methylenedi-p-phenylene) disemicarbazide, tobias acid, 2,4,5-trichloroaniline, o-tolidine, o-toluidine, m-toluidine, p-toluidine, m-toluylenediamine, sodium naphthionate, o-nitroaniline, m-nitroaniline, p-nitroaniline, o-nitro-p-chloroaniline, m-nitro-p-toluidine, o-chloro-p-toluidine-m-sulfonic acid, p-hydroxyphenylacetamide, 7-anilino-4-hydroxy-2-naphthalenesulfonic acid, phenylhydrazine, o-phenylenediamine, m-phenylenediamine, p-phenylenediamine, p-phenetidine, phenethylamine, benzylamine, benzophenone hydrazone, mesidine, metanilic acid, N-methylaniline, 2-methyl-4-nitroaniline, 2-methyl-4-methoxydiphenylamine, 2-amino-5-methylbenzenesulfonic acid, leuco-1,4-diaminoanthraquinone, paramine, p-hydroxyphenylglycine, acetaldehyde ammonia, acetoguanamine, 3-amino-1, 2, 4-triazole, 2-aminopyridine, 3-aminopyridine, 4-aminopyridine, 1-(2-aminoethyl) piperazine, N-(3-aminopropyl)morpholine, 1-amino-4-methylpiperazine, isocyanuric acid, imidazole, 2-methylimidazole, 2-ethyl-4-methylimidazole, 2-phenylimidazole, 2-undecylimidazole, 2-heptadecylimidazole, 2-phenyl-4-methylimidazole, 1-aminoethyl-2-methylimidazole, 1-(cyanoethylaminoethyl)-2-methylimidazole, N-(2-(2-methyl-1-imidazolyl)ethyl)urea, 2,4-diamino-6-(2-methyl-1-imidazolylethyl)-1,3,5-triazine, 2,4-diamino-6-(2-undecyl-1-imidazolylethyl)-1,3,5-tiazine, 2,4-diamino-6-(2-ethyl-4-methyl-1-imidazolylethyl)-1,3,5-tiazine, 2-phenyl-4-methyl-5-hydroxymethylimidazole, 2-phenyl-4,5-bis (hydroxymethyl)imidazole, an adduct of 2-methylimidazole and isocyanuric acid, an adduct of 2-phenylimidazole and isocyanuric acid, an adduct of 2,4-diamino-6-(2-methyl-1-imidazolylethyl)-1,3,5-triazine and isocyanuric acid, 2-methyl-4-formylimidazole, 2-phenyl-4-formylimidazole, 4-formylimidazole, 2,4-dimethyl-5-formylimidazole, 2,4-diphenyl-5-formylimidazole, 4-methylimidazole, 4-methyl-5-(hydroxymethyl)imidazole, 2-amino-4,5-dicyanoimdazole, imidazole-4,5-dicarboxylic acid, 3-carbamoyl-2-pyrazine carboxylic acid, imide succinate, quinaldine, quinoline, 1,3-di(4-piperidyl)propane, 2-imidazolidinone, 5,5-dimethylhydantoin, 2,5-dimethylpiperazine, cis-2,6-dimethylpiperazine, 3,5-dimethylpyrazole, 2-methyl-4-pyrazolone, 5,5'-bi-1H-tetrazole, 5-phenyl-1H-tetrazole, 5-methyl-lH-tetrazole, 1,2,3,4-tetrahydroquinoline, bis(aminopropyl)piperazine, 1,3-bis(hydrazinocarboethyl)-5-isopropylhydantoin, hydantoin, (hydroxyethyl)piperazine, 2-pipecoline, 3-pipecoline, 4-pipecoline, 2-(1-piperazinyl)pyrimidine, piperazine, piperidine, pyrrolidine, pyrrole, phenylpyrazolidone, benzoguanamine, N-methylpiperazine, 2-methylpiperazine, 3-methyl-5-pyrazolone, 1-methylol-5,5-dimethylhydantoin, melamine, and morpholine. In addition, hindered amine light stabilizers (HALSs) may also be used. Examples of HALSs include bis(2,2,6,6,-tetramethyl-4-piperidyl) sebacate, Sanol LS-770 (manufactured by Sankyo Co., Ltd.), Adekasutabu LA-77 (manufactured by Asahi Denka Co., Ltd.), Sumisorb 577 (manufactured by Sumitomo Chemical Co., Ltd.), Biosorb 04 (manufactured by Kyodo Chemical Co., Ltd.), Chimassorb 944LD (manufactured by Ciba Specialty Chemicals), Tinuvin 144 (manufactured by Ciba Specialty Chemicals), Adekasutabu LA-52 (manufactured by Asahi Denka Co., Ltd.), Adekasutabu LA-57 (manufactured by Asahi Denka Co., Ltd.), Adekasutabu LA-67 (manufactured by Asahi Denka Co., Ltd.), Adekasutabu LA-68 (manufactured by Asahi Denka Co., Ltd.), Adekasutabu LA-77 (manufactured by Asahi Denka Co., Ltd.), Adekasutabu LA-87 (manufactured by Asahi Denka Co., Ltd.), and Goodrite UV-3034 (manufactured by Goodrich Corporation). These may be used alone or in combination.

Among them, when primary amines with a boiling point of 100° C. or less, such as methylamine and ethylamine, or secondary amines with a boiling point of 100° C. or less, such as dimethylamine and diethylamine, are used, excess amine compounds can be easily removed by distillation under reduced pressure, and thereby the purification step can be simplified, which is preferable. When HALSs are used, it is not necessary to remove excess HALSs because they function as stabilizers, and the purification step can also be simplified. Furthermore, due to excess HALSs, the resultant polymers have improved weatherability and light resistance.

When ammonia is used, as in primary or secondary amines with a boiling point of 100° C. or less, excess ammonia can be removed by distillation under reduced pressure, and thereby the purification step can be simplified, which is preferable.

However, if a large amount of amine compound remains in the polymer, it reacts with and consumes the compound having a crosslinkable silyl group and an isocyanato group in each molecule, thus being uneconomical. Therefore, most preferred are ammonia, primary amines with a boiling point of 100° C. or less, and secondary amines with a boiling point of 100° C. or less, which can easily be removed under reduced pressure.

In the reaction for converting thiocarbonylthio groups into mercapto groups, the amount of the processing agent used is not particularly limited. When a base or acid is used as the processing agent, in view of ease of handling and reactivity, the amount used is preferably 0.01 to 100 parts by weight, more preferably 0.05 to 50 parts by weight, and most preferably 0.1 to 30 parts by weight based on 100 parts by weight of the vinyl polymer. When ammonia, hydrazine, or an amine compound is used as the processing agent, because of a high introduction rate of mercapto groups, the amount of ammonia, hydrazine, or amine compound is preferably 0.5 to 1,000 moles, and more preferably 1 to 500 moles, based on 1 mole of thiocarbonylthio group.

In the present invention, when the thiocarbonylthio group-containing vinyl polymer is treated with the processing agent, the reaction conditions are not particularly limited. For example, a method in which the polymer is dissolved in an organic solvent, and the processing agent is added thereto; a method in which the processing agent is added to a water-based dispersion or emulsion; or a method in which the processing agent is directly added to the solid or molten polymer itself may be employed. The treatment temperature is not particularly limited. In view of reactivity and stability of the polymer, the treatment temperature is preferably −50° C. to 300° C., and more preferably −10° C. to 200° C.

A mercapto-group containing vinyl polymer is thereby produced.

In the production process of the present invention, using the mercapto groups of the mercapto group-containing vinyl polymer prepared by the method described above or the like, the polymer and a compound having a crosslinkable silyl group and an isocyanato group in each molecule are coupled.

The compound having a crosslinkable silyl group and an isocyanato group in each molecule used in the present invention is not particularly limited. In view of availability and cost, the compound having a crosslinkable silyl group and an isocyanato group in each molecule is preferably a compound represented by general formula (4):

$$OCN-(CH_2)_n-Si(R^4)_{3-a}(X)_a \qquad (4)$$

(wherein $R^4$ is an alkyl group, a substituted alkyl group, an aryl group, a substituted aryl group, an aralkyl group, a substituted aralkyl group, or a triorganosiloxy group; X is a hydroxyl group or a hydrolyzable group; n is an integer of 3 or more: a is 1, 2, or 3; when a is 1, two $R^4$s may be the same or different; and when a is 2 or 3, two or three Xs may be the same or different). In view of availability, preferably, $R^4$ has 1 to 20 carbon atoms, and n is 3 to 500.

Specific examples of the hydrolyzable group X in general formula (4) include, but are not limited to, a hydrogen atom, a halogen atom, an alkoxy group, an acyloxy group, a ketoximate group, an amino group, an amide group, an acid amide group, an aminooxy group, a mercapto group, and an alkenyloxy group. Among them, an alkoxy group is preferred because of its mild hydrolyzability, ease of handling, and low reactivity with the isocyanato group. In view of availability and reactivity, an alkoxy group having 6 or less carbon atoms, such as methoxy, ethoxy, or phenoxy, is more preferred.

The compounds having a crosslinkable silyl group and an isocyanato group in each molecule used in the present invention may be used alone or in combination. Among these compounds, in view of high stability, availability, and cost, more preferred are γ-isocyanatopropyltrimethoxysilane, γ-isocyanatopropyldimethoxymethylsilane, γ-isocyanatopropyltriethoxysilane, and γ-isocyanatopropyldiethoxymethylsilane.

The amount of the compound having a crosslinkable silyl group and an isocyanato group in each molecule used is not particularly limited. In view of the fact that satisfactory physical properties are exhibited when a curable composition containing the coupled polymer is cured, the amount used, on the basis of the isocyanato group, is preferably 0.4 to 50 moles, more preferably 0.5 to 30 moles, and most preferably 0.8 to 20 moles, relative to 1 mole of the mercapto group of the polymer. Even when the compound having a crosslinkable silyl group and an isocyanato group in each molecule is used in excess relative to the mercapto group of the polymer, it is not particularly necessary to remove or purify the excess compound because the excess compound acts as a silane coupling agent when a curable composition containing the polymer is produced.

In the production process of the present invention, mercapto groups of the polymer and isocyanato groups of the compound having a crosslinkable silyl group and an isocyanato group in each molecule are coupled to form thiourethane bonds (—SC(=O)NH— or —OC(=S)NH—), and thereby crosslinkable silyl groups are introduced into the polymer. In the reaction, in order to improve the reaction efficiency, a urethane formation catalyst may be used as necessary.

Any urethane formation catalyst which is commonly used in the art may be used in the present invention. For example, the catalysts cited in Polyurethanes: Chemistry and Technology, Part I, Table 30, Chapter 4, Saunders and Frisch, Interscience Publishers, New York, 1963 may be used, but usable catalysts are not limited thereto. These may be used alone or in combination. In view of high catalytic activity, preferred examples of urethane formation catalysts include tin-based urethane formation catalysts, such as tin octylate, tin stearate, dibutyltin dioctoate, dibutyltin dioleylmaleate, dibutyltin dibutylmaleate, dibutyltin dilaurate, 1,1,3,3-tetrabutyl-1,3-dilauryloxycarbonyldistannoxane, dibutyltin diacetate, dibutyltin diacetylacetonate, dibutyltin bis(o-phenylphenoxide), dibutyltin oxide, dibutyltin bis(triethoxysilicate), dibutyltin distearate, dibutyltin bis(isononyl-3-mercaptopropionate), dibutyltin bis(isooctyl thioglycolate), dioctyltin oxide, dioctyltin dilaurate, dioctyltin diacetate, and dioctyltin diversatate. In view of storage stability, more preferred are tin-based urethane formation catalysts containing sulfur atoms, such as dibutyltin bis(isononyl-3-mercaptopropionate) and dibutyltin bis(isooctyl thioglycolate).

The amount of the urethane formation catalyst used in the present invention is not particularly limited, but is preferably 0.0001 to 0.5 parts by weight, and more preferably 0.001 to 0.1 parts by weight, based on 100 parts by weight of the vinyl polymer. If the amount is less than 0.0001 parts by weight, sufficient reactivity may not be obtained. If the amount exceeds 0.5 parts by weight, physical properties, such as heat resistance, weatherability, hydrolysis resistance, and storage stability, of the resultant vinyl polymer, curable composition, and cured composition obtained by curing the composition may be degraded.

In the present invention, when the mercapto groups of the polymer and the isocyanato groups of the compound having a crosslinkable silyl group and an isocyanato group in each molecule are coupled, a solvent may be used in order to homogeneously dissolve the catalyst or the compounds, or in order to improve the temperature control of the reaction system or the reaction efficiency. Examples of solvents which may be used for these purposes include, but are not limited to, hydrocarbons, such as hexane, cyclohexane, ethylcyclohexane, heptane, octane, dodecane, benzene, toluene, xylene, and dodecylbenzene; halogenated hydrocarbons, such as chloroform, methylene chloride, 1,2-dichloroethane, chlorobenzene, and o-dichlorobenzene; and ethers, such as diethyl ether, tetrahydrofuran, dioxane, and ethylene glycol dimethyl ether. These may be used alone or in combination. In order to prevent side reactions associated with the isocyanato group and crosslinkable silyl group, the water content of the solvent used is preferably 500 ppm or less, and more preferably 200 ppm or less.

A crosslinkable silyl group-containing polymer of the present invention is thereby produced. Scheme 1 illustrates a reaction scheme in the case when a thiocarbonylthio group-containing compound represented by general formula (3) is used.

Scheme 1

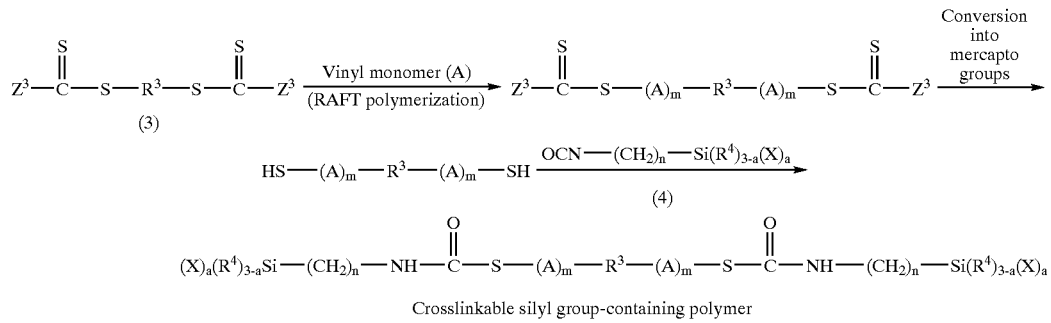

Crosslinkable silyl group-containing polymer

Crosslinkable silyl group-containing polymers produced in accordance with the present invention can be used for various purposes depending on their physical properties. Examples of applications include, but are not limited to, sealants, adhesives, pressure-sensitive adhesives, elastomeric adhesives, hardenable pressure-sensitive adhesives, hot-melt adhesives, reactive hot-melt adhesives, reactive thermoplastic elastomers, reactive synthetic rubbers, and reactive thermoplastic resins; various molded objects, such as hoses, sheets, films, flat plates, corrugated plates, pipes, sashes, shoe soles, sporting goods, textiles, toys, automobile components, gaskets, packings, foams, synthetic marbles, resins alternative to glass, containers, bottles, bottle caps, artificial hair, artificial skin, pillars, wall materials, floor materials, grips, doors, electric appliance cases, lenses, optical components, electric circuit boards, electronic components, and wire coverings; modifiers, such as asphalt modifiers, resin modifiers, rubber modifiers, and cement modifiers; paint and coating materials; and potting materials for electronic components.

Among the applications described above, when elastomeric properties are required in the resultant cured compositions, such as in sealants, adhesives, and pressure-sensitive adhesives, crosslinkable silyl group-containing polymers having a glass transition temperature of 30° C. or less are preferred. Preferably, such a crosslinkable silyl group-containing polymer contains, as a component, an n-butyl acrylate homopolymer or a copolymer containing n-butyl acrylate as a principal constituent, or the like, in the molecule. In view of high strength of the resultant cured composition, the crosslinkable silyl group-containing polymer preferably has crosslinkable silyl groups at both ends.

Among the applications described above, when crosslinkable silyl group-containing polymers are used for reactive hot-melt adhesives, reactive thermoplastic elastomers, and the like, preferred crosslinkable silyl group-containing polymers are those which are cured after molding or bonding to produce cured compositions having excellent heat resistance and compression set characteristics while exhibiting physical properties of thermoplastic elastomers, e.g., excellent moldability. In order to prepare such a crosslinkable silyl group-containing polymer, for example, crosslinkable silyl groups are introduced into a thermoplastic elastomer having a hard segment and a soft segment, which is commonly used in the art. Examples of such thermoplastic elastomers include, but are not limited to, methyl methacrylate-n-butyl acrylate-methyl methacrylate triblock copolymers, styrene-butadiene-styrene triblock copolymers, methyl methacrylate-n-butyl acrylate diblock copolymers, styrene-butadiene diblock copolymers, and vinyl chloride-acrylonitrile multiblock copolymers.

Among the applications described above, when crosslinkable silyl group-containing polymers are used for reactive synthetic rubbers, as the crosslinkable silyl group-containing polymer, for example, polymers produced by introducing crosslinkable silyl groups into synthetic rubbers which are commonly used in the art are used. Examples of synthetic rubbers include, but are not limited to, polybutadiene, poly (vinyl chloride), polyisoprene, vinyl chloride-vinyl acetate copolymers, vinyl chloride-acrylonitrile copolymers, poly (n-butyl acrylate), methyl methacrylate-butyl acrylate copolymers, butyl acrylate-butadiene-styrene copolymers, ethylene-propylene-diene copolymers, and methyl methacrylate-butadiene-styrene copolymers. The crosslinkable silyl group-containing polymers (reactive synthetic rubbers) prepared by using such synthetic rubbers have superior heat resistance, heat stability, and compression set characteristics compared to conventional synthetic rubbers.

Among the applications described above, when crosslinkable silyl group-containing polymers are used for reactive thermoplastic resins, as the crosslinkable silyl group-containing polymer, for example, polymers produced by introducing crosslinkable silyl groups into thermoplastic resins which are commonly used in the art, such as vinyl chloride resins, styrene resins, and acrylic resins, are used, but not limited thereto. The crosslinkable silyl group-containing polymers (reactive thermoplastic resins) prepared by using such thermoplastic resins have excellent heat resistance, heat stability, and compression set characteristics along with the advantage of the conventional thermoplastic resins, e.g., excellent moldability.

In the curable composition of the present invention containing the crosslinkable silyl group-containing polymer, in order to adjust various physical properties, at least one type of additives may be compounded as necessary. Examples of additives include plasticizers, thixotropy-improving agents, heat resistance-improving agents, stabilizers, antioxidants, ultraviolet absorbers, hindered amine light stabilizers (HALSs), antistatic agents, fire retardants, colorants, blowing agents, lubricants, mildewproofing agents, nucleating additives, vulcanization accelerators, aging resisters, vulcanizing agents, antiscorching agents, peptizers, tackifiers, latex coagulants, processing aids, inorganic fillers, silane coupling agents, and rubber materials. Optimum additives may be selected depending on the type and composition of the crosslinkable silyl group-containing polymer, the application of the cured composition, etc.

The curable compositions of the present invention containing the crosslinkable silyl group-containing polymers may contain condensation catalysts as necessary. In particular, when the curable compositions are used as moisture-curing compositions, such as sealants, adhesives, pressure-sensitive adhesives, paint, reactive hot-melt adhesives, reactive thermoplastic resins, and reactive thermoplastic elastomers, condensation catalysts are preferably incorporated into the curable compositions. A condensation catalyst is a compound which catalyzes the reaction in which crosslinkable silyl groups are coupled with each other to form a siloxane bond. Examples of condensation catalysts include, but are not limited to, titanate esters, such as tetrabutyl titanate and tetrapropyl titanate; organotin compounds, such as dibutyltin dilaurate, dibutyltin bisacetylacetonate, dibutyltin oxide, dibutyltin dimethoxide, dibutyltin maleate, dibutyltin diacetate, tin octylate, and tin naphthenate; lead compounds, such as lead octylate; amine compounds, such as butylamine, octylamine, dibutylamine, monoethanolamine, diethanolamine, triethanolamine, diethylenetriamine, triethylenetetramine, oleylamine, cyclohexylamine, benzylamine, diethylaminopropylamine, xylylenediamine, triethylenediamine, guanidine, diphenylguanidine, 2,4,6-tris(dimethylaminomethyl)phenol, morpholine, N-methylmorpholine, and 1,3-diazabicyclo [5.4.6]undecene-7; carboxylate salts of these amine compounds; low-molecular-weight polyamide resins prepared from an excess polyamine and a polybasic acid; reaction products from an excess polyamine and an epoxy compound; and amino group-containing silane coupling agents, such as γ-aminopropyltrimethoxysilane and N-(β-aminoethyl)aminopropylmethyldimethoxysilane. These condensation catalysts may be used alone or in combination. Among these condensation catalysts, organotin compounds are preferred because of high activity.

In the curable composition of the present invention, the amount of condensation catalyst used is not particularly limited. In view of reactivity, preferably, the condensation catalyst is used in an amount of 0 to 10% by weight relative to the crosslinkable silyl group-containing polymer. When a urethane formation catalyst is used during the production of the crosslinkable silyl group-containing polymer, a condensation catalyst is not necessarily required because the urethane formation catalyst also acts as a condensation catalyst.

The curable composition of the present invention may be provided in any form. Typical examples of curable compositions include a one-part curable composition in which all the components of the composition are preliminarily mixed and hermetically sealed, and which is cured by moisture in air after being applied to a desired place; and a two-part curable composition in which a mixture of components, such as a crosslinkable silyl group-containing polymer, a curing catalyst, and water, and a curing agent are separately prepared, and mixed before use.

In accordance with the present invention, it is possible to simply prepare crosslinkable silyl group-containing polymers having desired polymer components using thiocarbonylthio group-containing compounds. Consequently, it is possible to prepare crosslinkable silyl group-containing polymers having desired properties and various curable compositions. Examples of applications of the resultant curable compositions include, but are not limited to, sealants, adhesives, pressure-sensitive adhesives, elastomeric adhesives, hardenable pressure-sensitive adhesives, hot-melt adhesives, reactive hot-melt adhesives, reactive thermoplastic elastomers, reactive synthetic rubbers, and reactive thermoplastic resins; various molded objects, such as hoses, sheets, films, flat plates, corrugated plates, pipes, sashes, shoe soles, sporting goods, textiles, toys, automobile components, gaskets, packings, foams, synthetic marbles, resins alternative to glass, containers, bottles, bottle caps, artificial hair, artificial skin, pillars, wall materials, floor materials, grips, doors, electric appliance cases, lenses, optical components, electric circuit boards, electronic components, and wire coverings; modifiers, such as asphalt modifiers, resin modifiers, rubber modifiers, cement modifiers, and surface modifiers; paint and coating materials; silane coupling agents, macromonomers used for resin modification, polymer production, resin production, adhesive modification, pressure-sensitive adhesive modification, etc., and potting materials for electronic components.

BEST MODE FOR CARRYING OUT THE INVENTION

While the present invention will be described based on the examples below, it is to be understood that the invention is not limited thereto.

In the description below, the weight-average molecular weight (Mw), number-average molecular weight (Mn), and molecular weight distribution (Mw/Mn) were determined by gel permeation chromatography (GPC). In the GPC, chloroform was used as an eluent, and a polystyrene gel column was used. The analysis was carried out on the basis of polystyrene.

Izod impact strength was measured according to ASTM D256-56, using V-notched specimens, and average values measured at n=5 were calculated. Gardner strength was measured according to ASTM D3029-84-GB, using a 700 g weight, at 23° C., and at n=40. Melt viscosity was measured according to JIS K-7199, using a capillary rheometer, at a shear rate of 1,216 s$^{-1}$. In a spiral flow test, square spiral molded objects with a thickness of 3 mm were injection-molded at a cylinder temperature of 250° C., a die temperature of 70° C., and an injection pressure of 608 kgf/cm$^2$, and molding fluidity was evaluated based on the length (mm) thereof.

EXAMPLE 1

Into a 1 L reactor equipped with an agitator, a thermometer, a nitrogen gas inlet tube, and a reflux condenser tube, was placed 181 g of n-butyl acrylate as a vinyl monomer, 40 mg of 1,1'-azobis(1-cyclohexanecarbonitrile) as a polymerization initiator, 635 mg of compound represented by formula (5):

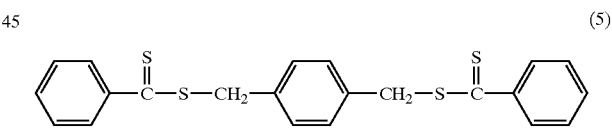

(5)

as a thiocarbonylthio group-containing compound, and 300 mL of toluene as a solvent, and the reactor was nitrogen-purged. The reaction solution was heated at 90° C. for 5 hours while being stirred. Toluene was removed from the reaction solution by distillation under reduced pressure. Thereby, 110 g of polymer (Mw=77,000, Mn=56,900, and Mw/Mn=1.35) was produced. $^1$H NMR measurement confirmed that thiocarbonylthio groups were introduced into both ends of the polymer, and the introduction rate was 93% on the both-ends basis.

The resultant poly(n-butyl acrylate) having thiocarbonylthio groups at both ends (110 g) was dissolved in 400 mL of toluene, and 30 g of monoethylamine as an amine compound was added thereinto, followed by stirring at 10° C. for 5 hours. The remaining monoethylamine and toluene were removed by distillation under reduced pressure, and a polymer was thereby produced. $^1$H NMR measurement confirmed that the resultant polymer was poly(n-butyl acrylate) having mercapto groups at both ends, and the introduction rate of mercapto groups was 90% on the both-ends basis.

The resultant poly(n-butyl acrylate) having mercapto groups at both ends (105 g) was dissolved in 400 mL of dehydrated toluene, and in a nitrogen atmosphere, 10 mg of dibutyltin bis(isooctyl thioglycolate) as a urethane formation catalyst and 800 mg of γ-isocyanatopropyldimethoxymethylsilane as a compound having a crosslinkable silyl group and an isocyanato group in each molecule were added thereinto, followed by stirring at 80° C. for 8 hours. Toluene was removed by distillation under reduced pressure, and poly(n-butyl acrylate) having dimethoxymethylsilyl groups at both ends was thereby produced.

Dibutyltin dimethoxide (1 part by weight) as a curing catalyst was mixed into 100 parts by weight of the resultant poly(n-butyl acrylate) having dimethoxymethylsilyl groups at both ends, and the mixture was poured into a slab mold, deaerated under reduced pressure, and left to stand in air at room temperature for 4 days. A cured sheet which was uniform and elastomeric was thereby obtained. A No. 2(⅓) dumbbell specimen was formed by die-cutting the cured sheet, and a tensile test was carried out using Autograph manufactured by Shimadzu Corp. (measurement conditions: 23° C., 200 mm/min). The tensile strength at break was 0.45 MPa, and the elongation at break was 29%.

Next, in the same manner as that described above, 1 part by weight of dibutyltin dimethoxide was mixed into 100 parts by weight of poly(n-butyl acrylate) having dimethoxymethylsilyl groups at both ends. The resultant mixture was applied to the surface of a marble plate at a thickness of 1 to 2 mm, to which another marble plate was bonded. After application, curing was performed by heating at 50° C. for 20 hours. Using a sunshine weatherometer (manufactured by Suga Test Instruments Co., Ltd.), ultraviolet irradiation was performed for 1,000 hours. As a result, crazing, deformation such as peeling, and coloration were not observed, adhesion failure did not occur, or staining to the stone was not observed.

EXAMPLE 2

Into a 1 L reactor equipped with an agitator, a thermometer, a nitrogen gas inlet tube, and a reflux condenser tube, was placed 181 g of n-butyl acrylate as a vinyl monomer, 40 mg of 1,1'-azobis(1-cyclohexanecarbonitrile) as a polymerization initiator, 1.40 g of compound represented by formula (5):

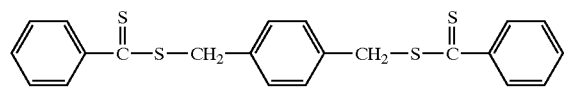

(5)

as a thiocarbonylthio group-containing compound, and 300 mL of toluene as a solvent, and the reactor was nitrogen-purged. The reaction solution was heated at 90° C. for 40 hours while being stirred. The reaction liquid was sampled, and GPC measurement confirmed that a polymer (Mw=56,500, Mn=41,100, and Mw/Mn=1.37) was produced. Furthermore, $^1$H NMR measurement confirmed that thiocarbonylthio groups were introduced into both ends of the polymer, and the introduction rate was 90% on the both-ends basis.

Next, 30 g of diethylamine as an amine compound was added thereinto, followed by stirring at 30° C. for 8 hours. The remaining diethylamine and toluene were removed by distillation under reduced pressure, and a polymer was thereby produced. $^1$H NMR measurement confirmed that the resultant polymer was poly(n-butyl acrylate) having mercapto groups at both ends, and the introduction rate of mercapto groups was 89% on the both-ends basis.

The resultant poly(n-butyl acrylate) having mercapto groups at both ends (150 g) was dissolved in 300 mL of toluene, and in a nitrogen atmosphere, 12 mg of dibutyltin bis(isooctyl thioglycolate) as a urethane formation catalyst and 1.35 g of γ-isocyanatopropyldimethoxymethylsilane as a compound having a crosslinkable silyl group and an isocyanato group in each molecule were added thereinto, followed by stirring at 80° C. for 8 hours. Toluene was removed by distillation under reduced pressure, and poly(n-butyl acrylate) having dimethoxymethylsilyl groups at both ends was thereby produced.

Dibutyltin bisacetylacetonate U-220 (manufactured by Nitto Kasei Co., Ltd.) (1 part by weight) as a curing catalyst and water (0.5 parts by weight) were mixed into 100 parts by weight of the resultant poly(n-butyl acrylate) having dimethoxymethylsilyl groups at both ends, and the mixture was poured into a slab mold and deaerated under reduced pressure. After the molded product was left to stand at room temperature for 2 days, heating was performed at 50° C. for 20 hours. A cured sheet which was uniform and elastomeric was thereby obtained. A No. 2(⅓) dumbbell specimen was formed by die-cutting the cured sheet, and a tensile test was carried out using Autograph manufactured by Shimadzu Corp. (measurement conditions: 23° C., 200 mm/min). The tensile strength at break was 0.47 MPa, and the elongation at break was 35%.

EXAMPLE 3

Into a 1 L reactor equipped with an agitator, a thermometer, a nitrogen gas inlet tube, a reflux condenser tube, and a dropping funnel, was placed 410 mg of sodium dodecylsulfate as an emulsifier and 400 g of distilled water, and the reactor was nitrogen-purged while the mixture was being stirred at 80° C. Next, 1.08 g of compound represented by formula (6):

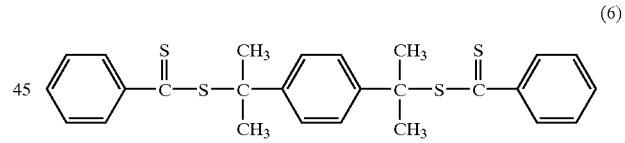

(6)

as a thiocarbonylthio group-containing compound, which was dissolved in 25.6 g of n-butyl acrylate as a vinyl monomer, was added into the reactor, followed by stirring at 80°C. for 20 minutes under nitrogen flow. As a polymerization initiator, 432 mg of 4,4'-azobis(4-cyanovaleric acid) together with 25 g of distilled water was further added thereinto. Stirring was performed at 80° C. for 30 minutes, and then a mixed solution of 51.3 g of n-butyl acrylate and 52.1 g of 2-methoxyethyl acrylate was dripped from the dropping funnel for over 1.5 hours. After dripping was completed, the mixture was stirred at 80° C. for 4 hours, and the emulsion was then cooled to room temperature. A salting-out method was performed, followed by filtration and washing. Thereby, an n-butyl acrylate-2-methoxyethyl acrylate random copolymer was produced. GPC analysis and $^1$H NMR analysis confirmed that in the polymer, Mw=64,700, Mn=56,300, and Mw/Mn=1.15 and that the introduction rate of thiocarbonylthio groups was 94% on the both-ends basis.

The polymer having thiocarbonylthio group at both ends (80 g) was dissolved in 100 mL of toluene, and 10 g of monoethylamine as an amine compound was added thereto, followed by stirring at 5° C. for 10 hours. Thereby, an n-butyl acrylate-2-methoxyethyl acrylate random copolymer having mercapto groups at both ends was produced.

After the remaining monoethylamine and toluene were removed by distillation under reduced pressure, the polymer was dissolved in 150 mL of dehydrated tetrahydrofuran, and 4 mg of dibutyltin bisacetylacetonate U-220 (manufactured by Nitto Kasei Co., Ltd.) as a urethane formation catalyst which was also usable as a curing catalyst and 550 mg of γ-isocyanatopropyldimethoxymethylsilane as a compound having a crosslinkable silyl group and an isocyanato group in each molecule were added thereinto. Stirring was performed at 80° C. for 5 hours. Tetrahydrofuran was removed by distillation, and an n-butyl acrylate-2-methoxyethyl acrylate random copolymer having dimethoxymethylsilyl groups at both ends was thereby produced.

The resultant copolymer was poured into a slab mold and deaerated under reduced pressure. After the molded product was left to stand at room temperature for 7 days, heating was performed at 50° C. for 10 hours. A cured sheet which was uniform and elastomeric was thereby obtained. A No. 2(⅓) dumbbell specimen was formed by die-cutting the cured sheet, and a tensile test was carried out using Autograph manufactured by Shimadzu Corp. (measurement conditions: 23° C., 200 mm/min). The tensile strength at break was 0.41 MPa, and the elongation at break was 64%.

EXAMPLE 4

Styrene (45.1 g) as a vinyl monomer and a compound represented by formula (7):

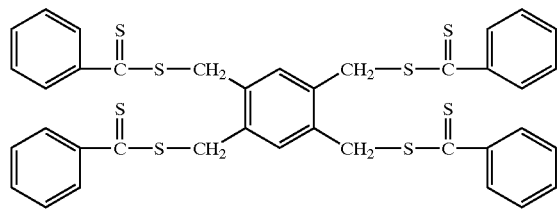

(7)

(273 mg) as a thiocarbonylthio group-containing compound were weighed and placed into a 200 mL reactor equipped with an agitator, a thermometer, a nitrogen gas inlet tube, and a reflux condenser tube, and the reactor was nitrogen-purged. Stirring was performed at 100° C. for 20 hours, and sampling was performed. GPC measurement confirmed that a polymer (MW=35,500, Mn=25,800, and Mw/Mn=1.38) was produced. The polymer was a star polymer with four arms, and it was confirmed by $^1$H NMR measurement that the polymer had a thiocarbonylthio group at each end. The introduction rate of thiocarbonylthio groups was 78% on the all-ends basis.

Toluene (100 mL) and monomethylamine (2.5 g) as an amine compound were added thereinto, followed by stirring at 0° C. for 15 hours. The solvent was removed by distillation under reduced pressure, and thereby a star polymer with four arms was produced. $^1$H NMR measurement confirmed that the polymer had a mercapto group at each end. The introduction rate of mercapto groups was 72% on the all-ends basis.

After monomethylamine was removed by distillation under reduced pressure, 30 mL of toluene was added, and in a nitrogen atmosphere, 5 mg of dibutyltin bis(isooctyl thioglycolate) as a urethane formation catalyst and 1.10 g of γ-isocyanatopropyltrimethoxysilane as a compound having a crosslinkable silyl group and an isocyanato group in each molecule were added thereinto, followed by stirring at 80° C. for 8 hours. Toluene was removed by distillation under reduced pressure, and thereby star polystyrene having a trimethoxysilyl group at each end was produced.

The resultant star polystyrene having a trimethoxysilyl group at each end was moldable as in conventional polystyrene resins. The resultant molded object had a higher heat distortion temperature than that of the conventional polystyrene resin by 30° C. or more, thus being excellent in heat resistance and heat stability.

EXAMPLE 5

Into a 1 L reactor equipped with an agitator, a thermometer, a nitrogen gas inlet tube, a reflux condenser tube, and a dropping funnel, was placed 7.5 g of compound represented by formula (6):

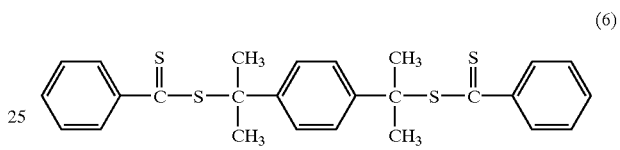

(6)

as a thiocarbonylthio group-containing compound, 20 g of acrylonitrile and 40 g of styrene as vinyl monomers, and 11 g of 2,2'-azobis(isobutyronitrile) as a polymerization initiator. Furthermore, into the dropping funnel was placed 500 g of toluene as a solvent and 130 g of acrylonitrile and 260 g of styrene as vinyl monomers, and the reactor was nitrogen-purged.

The solution in the reactor was stirred at 70° C. for 1 hour, and then the solution of acrylonitrile and styrene was dripped from the dropping funnel for over 5 hours. After dripping was completed, stirring was further performed at 70° C. for 10 hours. Sampling was performed, and GPC analysis and $^1$H NMR analysis confirmed that a thiocarbonylthio group-terminated acrylonitrile-styrene random copolymer (MW=27,000, Mn=22,300, and Mw/Mn=1.21) was produced. The compositional ratio was as follows: acrylonitrile:styrene=34:66 (weight ratio). The introduction ratio of thiocarbonylthio groups was 93% on the end basis.

The solution was cooled to room temperature, and 50 g of diethylamine as an amine compound was added thereinto, followed by stirring at room temperature for 10 hours. The excess diethylamine was removed by distillation under reduced pressure, and the reaction liquid was poured into 4 L of methanol to precipitate a polymer. The resultant polymer was dried under reduced pressure and then dissolved in 500 mL of dehydrated toluene. In a nitrogen atmosphere, 20 mg of dibutyltin bis(isooctyl thioglycolate) as a urethane formation catalyst and 6.0 g of γ-isocyanatopropyldimethoxymethylsilane as a compound having a crosslinkable silyl group and an isocyanato group in each molecule were added thereinto, followed by stirring at 50° C. for 6 hours. Toluene was removed by distillation under reduced pressure, and an acrylonitrile-styrene random copolymer having dimethoxymethylsilyl groups at both ends was thereby produced. The copolymer was moldable as a thermoplastic resin.

EXAMPLE 6

A mixture of 100 parts by weight of vinyl chloride resin S1008 (manufactured by Kaneka Corporation), 2.5 parts by weight of dibutyltin maleate as a stabilizer, 0.5 parts by weight of Hoechst Wax E (manufactured by Hoechst Japan Ltd.) as a lubricant, 2.0 parts by weight of PA-20 (manufactured by Kaneka Corporation) as a processing aid, and 3.0 parts by weight of titanium oxide as a coloring agent was compounded with 12 parts by weight of the crosslinkable silyl group-containing polymer produced in Example 1 and 0.2 parts by weight of dibutyltin bisacetylacetonate. The resultant composition was roll-kneaded at a preset temperature of 180° C. for 5 minutes and formed into a sheet. The resultant sheet was thermopress-molded at a preset temperature of 190° C. to form a molded object with a thickness of 5 mm for evaluating physical properties. The Izod impact strength measured at 23° C. is shown in Table 1 below.

EXAMPLES 7 TO 10

Molded objects were formed as in Example 6 except that crosslinkable silyl group-containing polymers produced in Examples 2 to 5 were used, and Izod impact strength was measured. The results thereof are shown in Table 1.

COMPARATIVE EXAMPLE 1

A similar molded object was formed without compounding the crosslinkable silyl group-containing polymer in Example 5, and Izod impact strength was measured. The results thereof are shown in Table 1.

TABLE 1

|  | Crosslinkable silyl group-containing polymer | Izod impact strength (kJ/m$^2$) |
| --- | --- | --- |
| Example 6 | Example 1 | 14 |
| Example 7 | Example 2 | 15 |
| Example 8 | Example 3 | 12 |
| Example 9 | Example 4 | 11 |
| Example 10 | Example 5 | 13 |
| Comparative Example 1 | — | 3 |

As is evident from Table 1, the crosslinkable silyl group-containing polymers of the present invention are highly effective in improving impact resistance as resin modifiers.

EXAMPLE 11

A methacrylic resin, PARAPET G1000 (manufactured by Kuraray Co., Ltd.) (84 parts by weight) was compounded with 16 parts by weight of the crosslinkable silyl group-containing polymer produced in Example 1 and 0.5 parts by weight of dibutyltin dimethoxide. Using a vent-type twin-screw extruder (32 mm, L/D=25.5), the resultant composition was extrusion-kneaded at a preset temperature of 230° C. and pelletized. The resultant pellets were dried at 80° C. for 15 hours, and injection molding was then performed at a preset temperature of 230° C. A molded plate object (120×120×3 mm) for evaluating physical properties was produced. The Gardner strength of the molded object is shown in Table 2 below.

EXAMPLES 12 AND 13

Molded objects were formed as in Example 11 except that the crosslinkable silyl group-containing polymers produced in Examples 2 and 3 were used, and Gardner impact strength was measured. The results thereof are shown in Table 2.

COMPARATIVE EXAMPLE 2

A molded object was formed as in Example 11 without compounding the crosslinkable silyl group-containing polymer, and Gardner strength was measured. The results thereof are shown in Table 2.

TABLE 2

|  | Crosslinkable silyl group-containing polymer | Gardner strength (kg · cm) |
| --- | --- | --- |
| Example 11 | Example 1 | 18 |
| Example 12 | Example 2 | 19 |
| Example 13 | Example 3 | 19 |
| Comparative Example 2 | — | 9 |

As is evident from Table 2, when the crosslinkable silyl group-containing polymers of the present invention are used as resin modifiers, impact resistance is greatly improved.

EXAMPLE 14

A polycarbonate resin, LEXAN 141R-111 (manufactured by GE Plastics Japan, Ltd.), (95 parts by weight) as a thermoplastic resin, and Topanol CA (manufactured by Lipre Co., Ltd.)(0.3 parts by weight) and Adekasutabu PEP-36 (manufactured by Asahi Denka Co., Ltd.) (0.3 parts by weight) as stabilizers were prepared and compounded with 5 parts by weight of the crosslinkable silyl group-containing polymer produced in Example 1 and 0.1 parts by weight of dibutyltin diacetate. Using a vent-type twin-screw extruder (32 mm, L/D=25.5), the resultant composition was extrusion-kneaded at a preset temperature of 280° C. and pelletized. The resultant pellets were dried at 80° C. for 15 hours, and injection molding was then performed at a preset temperature of 280° C. to form a molded object (¼ inch thick) for evaluating physical properties. The Izod impact strength of the resultant molded object at 0° C. and the melt viscosity of the pellets at 280° C. are shown in Table 3 below. The results of visual evaluation of transparency are also shown in Table 3, wherein ⊙ represents being highly transparent, ○ represents being ordinarily transparent, Δ represents being slightly opaque, and x represents being opaque.

EXAMPLES 15 AND 16

Molded objects were formed as in Example 14 except that the crosslinkable silyl group-containing polymers produced in Examples 2 and 3 were used, and evaluations were performed. The results thereof are shown in Table 3.

COMPARATIVE EXAMPLE 3

A molded object was formed as in Example 14 without compounding the crosslinkable silyl group-containing polymer, and evaluations were performed as in Example 14. The results thereof are shown in Table 3.

TABLE 3

|  | Crosslinkable silyl group-containing polymer | Izod impact strength (kJ/m$^2$) | Melt viscosity (poise) | Transparency |
| --- | --- | --- | --- | --- |
| Example 14 | Example 1 | 10 | 3600 | ○ |
| Example 15 | Example 2 | 12 | 3400 | ○ |
| Example 16 | Example 3 | 15 | 3200 | ⊙ |
| Comparative Example 3 | — | 3 | 5100 | ⊙ |

As is evident from Table 3, when the crosslinkable silyl group-containing polymers of the present invention are used as resin modifiers, the impact resistance and moldability of the molded objects are greatly improved, and transparency is not substantially impaired.

EXAMPLE 17

A poly(butylene terephthalate) resin, DURANEX 2002 (manufactured by Polyplastic Co., Ltd.), (80 parts by weight), Topanol CA (manufactured by Lipre Co., Ltd.) (0.3 parts by weight) as a stabilizer, and Adekasutabu PEP-36 (manufactured by Asahi Denka Co., Ltd.) (0.3 parts by weight) as a HALS were prepared and compounded with 20 parts by weight of the crosslinkable silyl group-containing polymer produced in Example 1 and 0.2 parts by weight of dibutyltin diacetylacetonate. Using a vent-type twin-screw extruder (32 mm, L/D=25.5), the resultant composition was extrusion-kneaded at a preset temperature of 245° C. and pelletized. The resultant pellets were dried at 80° C. for 15 hours, and injection molding was then performed at a preset temperature of 250° C. to form a molded object (⅛ inch thick) for evaluating physical properties. The Izod impact strength at 23° C., the spiral flow, and the result of visual evaluation of transparency (wherein ⊙ represents being highly transparent, ○ represents being ordinarily transparent, Δ represents being slightly opaque, and x represents being opaque) of the resultant molded object are shown in Table 4 below.

EXAMPLES 18 AND 19

Molded objects were formed as in Example 17 except that the crosslinkable silyl group-containing polymer produced in Examples 2 and 3 were used, and evaluations were performed. The results thereof are shown in Table 4.

COMPARATIVE EXAMPLE 4

A molded object was formed as in Example 17 without compounding the crosslinkable silyl group-containing polymer. The Izod impact strength at 23° C., the spiral flow, and the result of visual evaluation of transparency of the resultant molded object are shown in Table 4.

TABLE 4

| | Crosslinkable silyl group-containing polymer | Izod impact strength (kJ/m²) | Spiral flow (mm) | Transparency |
|---|---|---|---|---|
| Example 17 | Example 1 | 16 | 220 | ○ |
| Example 18 | Example 2 | 15 | 210 | ○ |
| Example 19 | Example 3 | 19 | 330 | ⊙ |
| Comparative Example 4 | — | 3 | 110 | ⊙ |

As is evident from Examples 17 to 19 and Comparative Example 4, when the crosslinkable silyl group-containing polymers of the present invention are used as resin modifiers, impact resistance and moldability are greatly improved, and transparency is not substantially impaired.

INDUSTRIAL APPLICABILITY

In accordance with the production process of the present invention, a crosslinkable silyl group-containing vinyl polymer can be produced easily, and moreover, purification steps can be simplified, thus minimizing production cost. Furthermore, in addition to solution polymerization, a water-based polymerization technique, such as emulsion polymerization or suspension polymerization, can also be employed. Consequently, in industrial production, improved safety and low cost are ensured. A curable composition containing the crosslinkable silyl group-containing polymer is excellent in oil resistance, heat resistance, weatherability, low staining properties, and compression set characteristics, and easy to handle. When the crosslinkable silyl group-containing polymer is used as a resin modifier, the impact resistance and moldability of the resultant molded object are greatly improved, and high transparency is exhibited.

What is claimed is:

1. A process for producing a crosslinkable silyl group-containing polymer comprising the steps of:
    radically polymerizing a radically polymerizable vinyl monomer in the presence of at least one thiocarbonylthio group-containing compound selected from the group consisting of a compound represented by general formula (1):

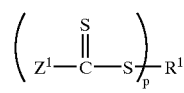

(1)

(wherein $R^1$ is a p-valent organic group of 1 or more carbon atoms which may contain one of nitrogen, oxygen, sulfur, halogen, silicon, phosphorus, and metal atoms, or which may be a polymer; $Z^1$ is a hydrogen atom, halogen atom, or monovalent organic group of 1 or more carbon atoms which may contain one of nitrogen, oxygen, sulfur, halogen, silicon, and phosphorus atoms, or which may be a polymer; when plural $Z^1$s are present, the plural $Z^1$s may be the same or different; and p is an integer of 1 or more), and a compound represented by general formula (2):

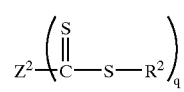

(2)

(wherein $R^2$ is a monovalent organic group of 1 or more carbon atoms which may contain one of nitrogen, oxygen, sulfur, halogen, silicon, phosphorus, and metal atoms, or which may be a polymer; $Z^2$ is an oxygen atom (when q=2), sulfur atom (when q=2), nitrogen atom (when q=3), or q-valent organic group of 1 or more carbon atoms which may contain one of nitrogen, oxygen, sulfur, halogen, silicon, and phosphorus atoms, or which may be a polymer; plural $R^2$s may be the same or different; and q is an integer of 2 or more), to prepare a thiocarbonylthio group-containing polymer;
    converting the thiocarbonylthio group of the polymer into a mercapto group; and
    coupling the polymer with a compound having a crosslinkable silyl group and an isocyanato group in each molecule via the mercapto group.

2. The process according to claim 1, wherein the thiocarbonylthio group-containing compound is represented by general formula (3):

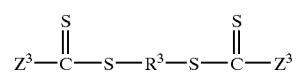

(3)

(wherein $R^3$ is a divalent organic group which may contain one of nitrogen, oxygen, sulfur, halogen, silicon, phosphorus, and metal atoms, or which may be a polymer; each $Z^3$ is a hydrogen atom, halogen atom, or monovalent organic group of 1 or more carbon atoms which may contain one of nitrogen, oxygen, sulfur, halogen, silicon, and phosphorus atoms, or which may be a polymer; and $Z^3$s may be the same or different).

3. The process according to claim 1, wherein the vinyl monomer is at least one compound selected from the group consisting of styrene, α-methylstyrene, vinyl chloride, vinylidene chloride, methacrylate esters, acrylate esters, methacrylic acid, acrylic acid, methacrylamide, acrylamide, methacrylonitrile, acrylonitrile, vinyl acetate, maleic anhydride, and maleimide compounds.

4. The process according to claim 1, wherein the vinyl monomer is at least one compound selected from the group consisting of methacrylate esters and acrylate esters.

5. The process according to claim 1, wherein the thiocarbonylthio group of the thiocarbonylthio group-containing polymer is converted into the mercapto group by a reaction with a processing agent comprising at least one compound selected from the group consisting of bases and acids.

6. The process according to claim 1, wherein the thiocarbonylthio group of the thiocarbonylthio group-containing polymer is converted into the mercapto group by a reaction with a processing agent comprising at least one compound selected from the group consisting of ammonia, hydrazine, and amine compounds.

7. The process according to claim 6, wherein the processing agent is at least one compound selected from the group consisting of ammonia, primary amine compounds with a boiling point of 100° C. or less, and secondary amine compounds with a boiling point of 100° C. or less.

8. The process according to claim 1, wherein the compound having a crosslinkable silyl group and an isocyanato group in each molecule is a compound represented by general formula (4):

$$OCN-(CH_2)_n-Si(R^4)_{3-a}(X)_a \quad (4)$$

(wherein $R^4$ is an alkyl group, a substituted alkyl group, an aryl group, a substituted aryl group, an aralkyl group, a substituted aralkyl group, or a triorganosiloxy group; X is a hydroxyl group or a hydrolyzable group; n is an integer of 3 or more; a is 1, 2, or 3; when a is 1, two $R^4$s may be the same or different; and when a is 2 or 3, two or three Xs may be the same or different).

9. The process according to claim 8, wherein the compound having a crosslinkable silyl group and an isocyanato group in each molecule is at least one compound selected from the group consisting of γ-isocyanatopropyltrimethoxysilane, γ-isocyanatopropyldimethoxymethylsilane, γ-isocyanatopropyltriethoxysilane, and γ-isocyanatopropyldiethoxymethylsilane.

10. The process according to claim 1, wherein the coupling is performed in the presence of a urethane formation catalyst.

11. The process according to claim 1, wherein the coupling is performed in the presence of a tin-based urethane formation catalyst containing a sulfur atom.

12. A crosslinkable silyl group-containing polymer produced by the process according to claim 1.

13. A curable composition comprising the crosslinkable silyl group-containing polymer according to claim 12.

14. The curable composition according to claim 13, further comprising a condensation catalyst.

* * * * *